(12) United States Patent
Bijor et al.

(10) Patent No.: US 10,291,574 B2
(45) Date of Patent: May 14, 2019

(54) SOCIAL MEDIA INTEGRATION FOR TRANSPORT ARRANGEMENT SERVICE

(71) Applicant: Uber Technologies, Inc., San Francisco, CA (US)

(72) Inventors: Rahul Bijor, San Francisco, CA (US); Matthew Wyndowe, San Francisco, CA (US); Zoran Martinovic, San Francisco, CA (US); Dmitry Shevelenko, San Francisco, CA (US); Amritha Prasad, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 217 days.

(21) Appl. No.: 15/221,933

(22) Filed: Jul. 28, 2016

(65) Prior Publication Data

US 2017/0034110 A1    Feb. 2, 2017

Related U.S. Application Data

(60) Provisional application No. 62/282,490, filed on Jul. 30, 2015.

(51) Int. Cl.
*H04L 12/58* (2006.01)
*H04L 29/08* (2006.01)
*G06Q 30/00* (2012.01)

(52) U.S. Cl.
CPC .............. *H04L 51/32* (2013.01); *H04L 51/24* (2013.01); *H04L 67/104* (2013.01); *H04L 67/12* (2013.01); *G06Q 30/00* (2013.01)

(58) Field of Classification Search
CPC ....... H04L 51/32; H04L 51/24; H04L 67/104; H04L 67/12; G08G 1/202; G06Q 30/00
USPC ........................................................ 709/206
See application file for complete search history.

(56) References Cited

U.S. PATENT DOCUMENTS

| 7,756,633 | B2 | 7/2010 | Huang et al. |
| 7,869,945 | B2 | 1/2011 | Huang et al. |
| 7,930,098 | B2 | 4/2011 | Huang et al. |
| 7,970,533 | B2 | 6/2011 | Huang et al. |
| 7,974,779 | B2 | 7/2011 | Huang et al. |

(Continued)

OTHER PUBLICATIONS

Whitson Gordon, How to turn your phone into a mind reading personal assistant, Oct. 9, 2012, p. 6, https://lifehacker.com/5950162/how-to-turn-your-phone-into-a-mind-reading-personal-assistant (Year: 2012).*

(Continued)

*Primary Examiner* — Patrice L Winder
*Assistant Examiner* — Lam H Duong
(74) *Attorney, Agent, or Firm* — Mahamedi IP Law LLP

(57) ABSTRACT

A transport arrangement and networking system can receive pick-up requests from user devices of requesting users. The pick-up requests can include a carpool service preference. The system can transmit an invitation to a driver device of a proximate carpool driver to service each received pick-up request and identify carpool riders riding with each requesting user. The system can further access social media data for the requesting user and the carpool riders. When the accessed social media data indicates a common link between the requesting user and the carpool rider(s) the system can generate and transmit a notification to the requesting user indicating the common link.

14 Claims, 7 Drawing Sheets

(56) References Cited

U.S. PATENT DOCUMENTS

| | | | |
|---|---|---|---|
| 8,036,824 B2 | 10/2011 | Huang et al. | |
| 8,086,400 B2 | 12/2011 | Huang et al. | |
| 8,095,305 B2 | 1/2012 | Huang et al. | |
| 8,224,571 B2 | 7/2012 | Huang et al. | |
| 2010/0057858 A1* | 3/2010 | Shen | H04W 4/21 |
| | | | 709/206 |
| 2010/0174747 A1* | 7/2010 | Farrell | G06Q 30/02 |
| | | | 707/776 |
| 2010/0280884 A1* | 11/2010 | Levine | G01C 21/3438 |
| | | | 705/13 |
| 2013/0290040 A1* | 10/2013 | Perry | G06Q 10/02 |
| | | | 705/5 |
| 2014/0129578 A1* | 5/2014 | Lehmann | G06F 17/30873 |
| | | | 707/758 |
| 2015/0133164 A1* | 5/2015 | Song | G06Q 10/10 |
| | | | 455/456.3 |
| 2015/0204684 A1* | 7/2015 | Rostamian | G01C 21/3438 |
| | | | 701/537 |
| 2015/0210287 A1* | 7/2015 | Penilla | B60W 40/08 |
| | | | 701/49 |
| 2016/0026936 A1 | 1/2016 | Richardson et al. | |
| 2016/0138928 A1* | 5/2016 | Guo | G01C 21/3438 |
| | | | 701/537 |
| 2016/0364823 A1* | 12/2016 | Cao | G06Q 50/30 |

OTHER PUBLICATIONS

Adena Demonte, EcoWeb Tool: Facebook's Carpool App, Jul. 24, 2007, all pages, https://gigaom.com/2007/07/24/ecoweb-tool-facebooks-carpool-app/ (Year: 2007).*

Embedded Posts, Mar. 11, 2015, Facebook, all pages, https://web.archive.org/web/20150311095641/https://developers.facebook.com/docs/plugins/embedded-posts/ (Year: 2015).*

Sharing on Facebook, Apr. 7, 2015, Facebook, all pages, https://web.archive.org/web/20150407084409/https://developers.facebook.com/docs/sharing/overview (Year: 2015).*

* cited by examiner

SOCIAL MEDIA INTEGRATION FOR TRANSPORT ARRANGEMENT SERVICE

CROSS REFERENCE TO RELATED APPLICATION

This application claims the benefit of priority to U.S. Provisional Application No. 62/282,490, entitled "SOCIAL MEDIA INTEGRATION FOR TRANSPORTATION ARRANGEMENT SERVICE," filed on Jul. 30, 2015; the aforementioned application being hereby incorporated by reference in its entirety.

BACKGROUND

With the advent of application-based on-demand transportation services, the connectivity between riders and drivers is vastly expanding.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
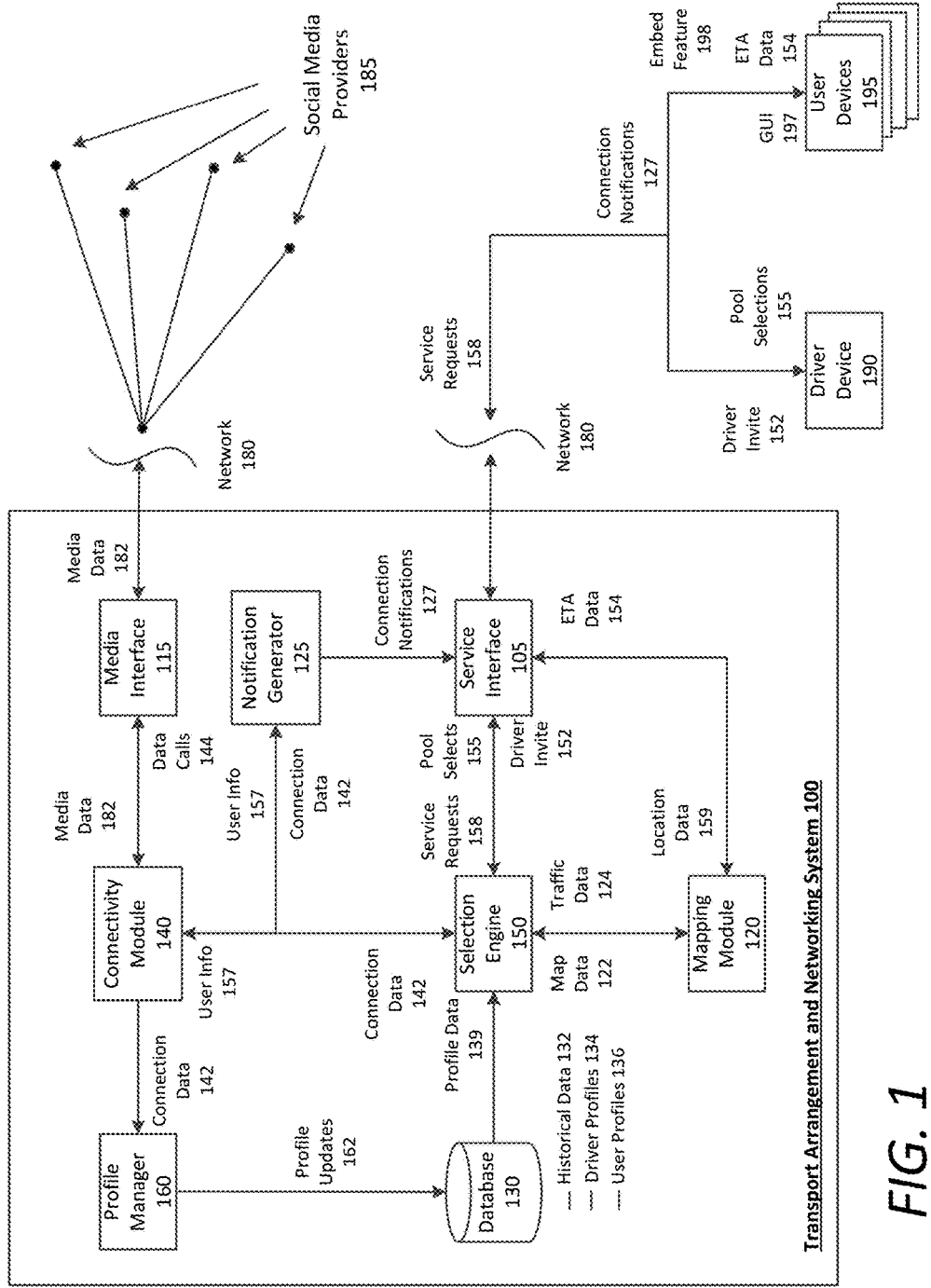
FIG. 1 is a block diagram illustrating an example transport arrangement and networking system as described herein.

In some examples described herein, a transport arrangement service is provided to facilitate networked transportation services to match drivers with requesting users. In accordance with examples described herein, the transport arrangement service can provide one or more application program interfaces (APIs) for developers of client applications (e.g., social media applications) so that users can be provided with open access to data and services across multiple platforms. For example, a social media application can utilize the APIs to communicate with both the social networking service itself and the transport arrangement service. Such interconnectivity can allow for much broader user experiences when accessing the transport arrangement service or engaging with other users of the transport arrangement service.

In many examples, a transport arrangement and networking system is provided to facilitate transportation services and social interaction between users of the transportation services. The transport arrangement and networking system can receive, over a network, pick-up requests from user devices of requesting users, and provide invitations to driver devices of proximate available drivers to service those pick-up requests. Each of the user devices and the driver devices can run a designated application connected with the transport arrangement service. A requesting user is enabled to select from a number of transport service types prior to submitting the transport request (e.g., a carpool service type). Additionally or alternatively, the transport arrangement service can be accessed via embedded buttons and/or widget features on a particular social media application displayed on the user's mobile device. In some example, such features can be associated with upcoming events and/or calendar data presented on a social media feed. The user may select an embedded service button on a particular event in order to schedule a transport arrangement to a venue associated with the event and/or check-in to the event upon arrival.

Upon receiving confirmation to service a specified pick-up request from a proximate driver, the transport arrangement and networking system can provide additional facilitation services leveraging social media interconnectivity between the requesting user, the confirmed driver, and any number of carpool participants. For example, when a user selects a carpool service, the user may not know the other users being picked up in the carpool. The transport arrangement and networking system utilize the APIs to access social media data of each of the carpool riders and/or the driver to identify potential points of connectivity. Such points of connectivity can include certain commonalities on one or more social media applications (e.g., friends or friends of friends on Facebook, connections to educational institutions, work-related connections or connections to a particular company, hometown connections, common countries of origin or places of birth, and the like). At the same time, examples as described address a specific problem which is encountered by people in many semi-social gatherings—specifically, how shared interests can be discovered if a given situation does not permit, or lend itself to human discussion and information gathering (e.g., introductions by the persons in the situation). Accordingly, some embodiments provide an intermediate service which enables functionality for obtaining such information, without involvement from the humans whom may be engaged with shared interest.

In certain implementations, the transport arrangement and networking system can further provide an option for a requesting user to select a carpool "association" service. Selection of the carpool association service can cause the transport arrangement and networking system to identify, as potential carpool riders with the requesting user, only those users who have one or more points of connectivity or social media commonalities with the requesting user. For example, upon receiving the carpool association selection, the transport arrangement and networking system can access social media data, such as the requesting user's profile on any number of social media applications, to identify other carpool association requestors that have points of connectivity with the requesting user.

Among other benefits, the examples described herein achieve a technical effect of improving user and driver access and social connectivity in connection with transport arrangement services.

As used herein, a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example transport arrangement and networking system 100. The system 100 can include a media interface 115 providing access and connectivity to any number of social media service providers 185 over a network 180. Furthermore, the system 100 can provide public APIs to the social media providers to enable data access between resources of the system 100 and the social media providers 185 (e.g., databases and/or servers storing user data, such as profile data, indicating potential cross-media commonality links between users). Users of the system 100 can be involved in various social media and networking services each providing a particular focus or targeted service. Such networking services can include social media and communication providers, such as FACEBOOK, MYSPACE, GOOGLE PLUS, SKYPE, WHATSAPP, APPLE FACETIME, LINKEDIN, gaming networks, online dating platforms, network forums, news providers, hobby networks, and the like.

The transport arrangement and networking system 100 allows for integration between such social media services and transportation facilitation services, such as those provided by UBER. Accordingly, social and profile feeds provided on those social media platforms can include a number of embed features providing integration with the transport arrangement and networking system 100, to allow for access between services. For example, an embed feature on a social media feed or advertisement can enable a user to request or schedule a pick-up using the transport arrangement and networking system 100, which can facilitate servicing pick-up requests by identifying proximate drivers, selecting an optimal one of those drivers based on temporal or physical proximity, and transmitting an invitation to the optimal driver to service the pick-up request.

Further, such connectivity between social networks enables the system 100 to provide added services for users in connection with transportation. For example, the system 100 can provide users with a carpool association service type that, when selected for a pick-up request, causes the system 100 to instigate data calls 144 to social media providers 185 in order to identify commonality links between the requesting user and potential carpool riders and/or drivers to bolster user experience. Thus, in various examples, the system 100 can include a service interface 105 that can receive service requests 158 from user devices 195. Such service requests 158 can originate from user interaction with a designated application associated with the transport arrangement and networking system 100, or, as discussed above, from a social media application with an embed feature thereon. Furthermore, the service request 158 can indicate that the requesting user prefers carpooling, which may be cost-wise preferable to an individual car service type.

In various implementations, the system 100 can include a selection engine 150 that receives the service request 158. The system 100 can also include a mapping module 120 that receives location data 159 corresponding to the user's location, or a location indicated in the service request 158. The location data 159 received by the mapping module 120 can also include driver locations from, for example, global positioning system (GPS) resources of the driver device(s) 190. The mapping module can provide map data 122 and/or traffic data 124 indicating the respective locations of the requesting user and available proximate drivers to the requesting user. In some examples, the user device 195 of the requesting user is provided ETA data 154 for a closest available proximate driver in light of a selected service type. For example, the requesting user can select a "Black Car" service type, and the mapping module 120 can provide ETA data 154 for the closest available luxury car. As another example, the requesting user can select a "carpool" or "associated carpool" service type, and the mapping module 120 can provide ETA data 154 for a closest available driver that can fulfill the selected service.

The selection engine 150 can utilize the map data 122 and traffic data 124, and can optionally utilize profile data 139 to select a driver to fulfill the service request 158. The system 100 can include a database 130 comprising historical data 132 for the transport facilitation services. The database 130 can also include user profiles 136 and driver profiles 134, which indicate various preferences, ratings data, and the like. If the service request 158 indicates a carpool request, the selection engine 150 can identify a proximate driver available to service carpool requests, and transmit a driver invitation 152 to the selection driver's device 190 over the network 180. The driver can provide a confirmation to service the carpool request, and pick-up the request user along a designated route. Once the confirmation is received, the mapping module 120 can provide map data 122 to the user device 195 of the requesting user to indicate the ETA for the selected driver.

In examples, the system 100 can include a connectivity module 140. The system 100 can provide the user devices 195 with an option to only be matched with carpool riders that have a commonality link with the requesting user on one or more social media platforms. This "associated carpool request" can be received by the selection engine 150, which can provider user information 157 of the requesting user to the connectivity module 140. The connectivity module 140 can utilize the user information 157 to generate data calls 144 to access additional user information from one or more social media service providers 185 via a media interface 115 of the system 100. Such data calls 144 can enable the system 100 to analyze social media aspects of the requesting user to identify potential commonality links with other carpool riders. The connectivity module 140 can further receive user data from other carpool (or associated carpool) requestors within a certain proximity of the requesting user, or a route to be traveled by the requesting user, and select candidate carpool riders that have such commonality links.

As provided herein, the commonality links can include a common friend link, a common educational institution link (e.g., the users graduated from or attended the same university), a common profession link (e.g., the users have the same or similar professions or careers), a common company link (e.g., the users are associated with or work for the same entity), a common hometown link (e.g., the users have lived in the same town, city, or state), a common place of origin link (e.g., the users were born or grew up in the same area), a common preferences link (e.g., the users enjoy similar activities, have the same or similar hobbies, enjoy similar forms of entertainment, etc.). The connectivity module 140 can receive identifying user information 157 from each user within a predetermined range requesting a carpool or associated carpool service, and determine whether commonality links between the requesting users exist via the social media providers 185. Accessing the social media data 182 from the social media providers 185 can provide such commonality links between the requesting user and one or more other requesting users, and the connectivity module 140 can provide the connection data 142 to the selection engine 150. The selection engine 150 can utilize the connection data 142 in order to make pool selections 155 of carpool riders that can ride with the requesting user.

In some examples, the pool selections 155 can be provided to the selected carpool driver's device 190 as additional driver invitations 152, which the driver can accept in order to create a carpool route. Accordingly, the requesting user can be paired with other carpool riders that have common links to the user (e.g., have a similar hobby, or attended the same school). Additionally or alternatively, the system 100 can identify patterns or routines of such users, and the connectivity module 140 can provide the connection data 142 to a profile manager 160 of the system 100, which can provide profile updates 162 for the user profiles 136 to indicate the commonality links.

In certain examples, the system 100 can further include a notification generator 125 that can receive the user information 157 of the requesting users and the connection data 142 from the connectivity module 140. The user information 157 can include identifying information that can enable the notification generator 125 to transmit notifications to individual user devices 195. When commonality links are identified between carpool riders, the notification generator 125 can generate and transmit connection notifications 127 to commonly linked carpool riders and/or carpool drivers. Timing and content of the notifications can vary. In some examples, regardless of whether a commonality link is found between two carpool riders, the notification generator 125 can provide a notification indication a particular quality of a carpool rider as, for example, a point of conversation. Such notifications can be transmitted to a rider prior to pick-up, or during the ride. Similarly, the notification generator 125 can transmit a connection notification 127 indicating the commonality link between two or more carpool riders. Additionally, the notification generator 125 can generate and transmit an invitation to connect with or become friends with a particular carpool rider after the user has arrived at the destination, or after a particular carpool rider has exited the vehicle.

Such notifications can be provided as a pop-up or push notification. Additionally or alternatively, the notification can be provided as an indicator on a status bar, or as an increment indication on a particular application or application icon on the user device 195. User selection of such indicators can show the invitation to connect, and the user can provide an affirmative or dismissal input by way of a simple input gesture, such as a swipe gesture.

In some implementations, the system 100 can provide further embed features for social media platforms. For example, the system 100 can provide a graphical user interface 197 upon execution of the designated application on the user device 195. The GUI 197 can enable the user to view and select various transport service types, request a particular service, view map data, and enable a payment service to pay for requested transportation. When a pick-up is scheduled or requested, the GUI 197 can include an embed feature 198 that can enable the user to take photographs, provide status updates, tag friends or fellow carpool riders, etc., and share such actions and updates on any number of social media platforms through the designated application. For example, during the trip, the user can view trip data on the GUI 197 designated application, and select the embed feature 198 to snap and share a photograph on the user's social media feed.

Still further, when a user inputs a destination for a pick-up request, the system 100 can also pull data from social media resources to enable the user to view photos or events associated with that destination. As an example, upon inputting the pick-up request or scheduling a future pick-up request on the designated application (e.g., an UBER app executing on a user device 195), the system 100 can access the user's social media data 182 to identify metadata, captions, file titles, or user tags that indicate a location, point of interest, or venue proximate to the destination. The system 100 can provide an indicator or notification on the designated application that enables the user to view status updates, social feed events, and/or images taken by the user or associates of the user that relate to the destination.

Methodology

Figure 2:
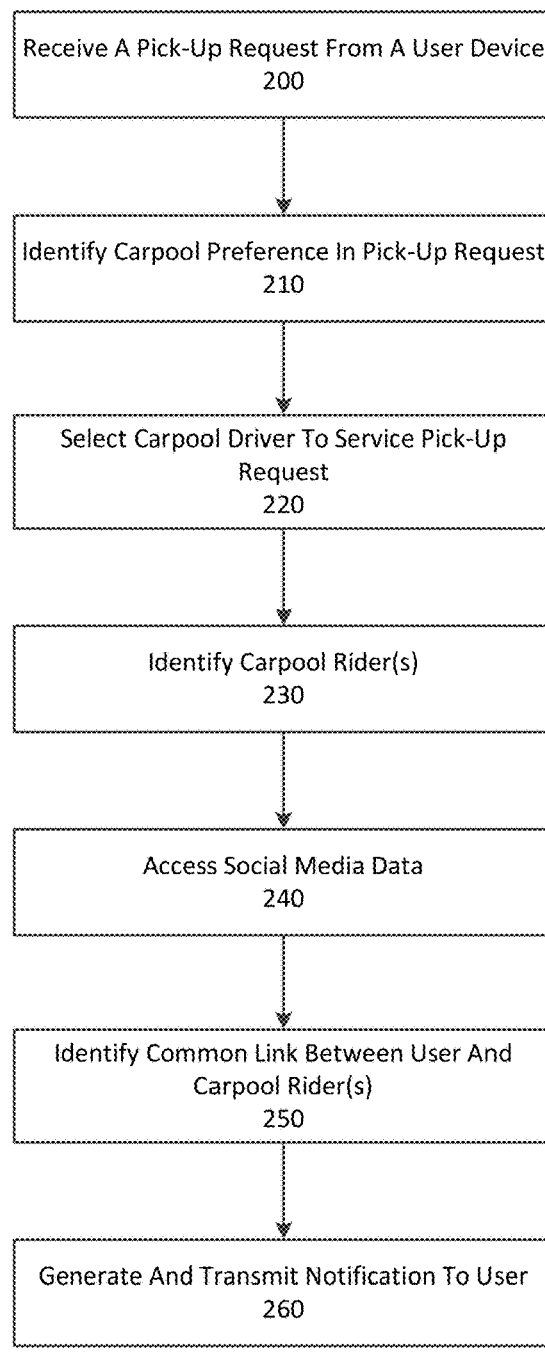
FIG. 2 is a high level flow chart illustrating an example method for facilitating user connectivity in connection with a transportation arrangement service.

FIG. 2 is a high level flow chart illustrating an example method for facilitating user connectivity in connection with a transportation arrangement service. The system 100 can receive a pick-up request from a user device 195 (200). The system 100 can identify that the pick-up request includes a carpool preference (210). Accordingly the system 100 can select a carpool driver to service the pick-up request (220). The system 100 may then identify other carpool riders that can be picked up along a route to a destination (230), and provide the carpool driver with added updates or invitations to continue picking up various riders. Thus, the carpool route may be dynamic, in that small adjustments to the route can be made dynamically as the carpool riders are picked up and dropped off, and additional carpool service requests are received.

Over the course of the carpool route, the system 100 can access social media data, from social media resources, to identify commonalities between carpool riders. The social media data can indicate common social media links between the carpool riders and provide notifications to the riders showing such links. Thus, the system 100 can access social media data corresponding to the carpool riders (240), and identify a number of common social media links between the carpool riders (250). The system 100 can generate and transmit notifications to other carpool riders and the requesting user indicating commonalities found via social media data. Furthermore, when the user arrives at the destination, the system 100 can transmit a notification to the user, which can invite the user to connect with the other carpool riders via one or more social media platforms (260).

Figure 3:
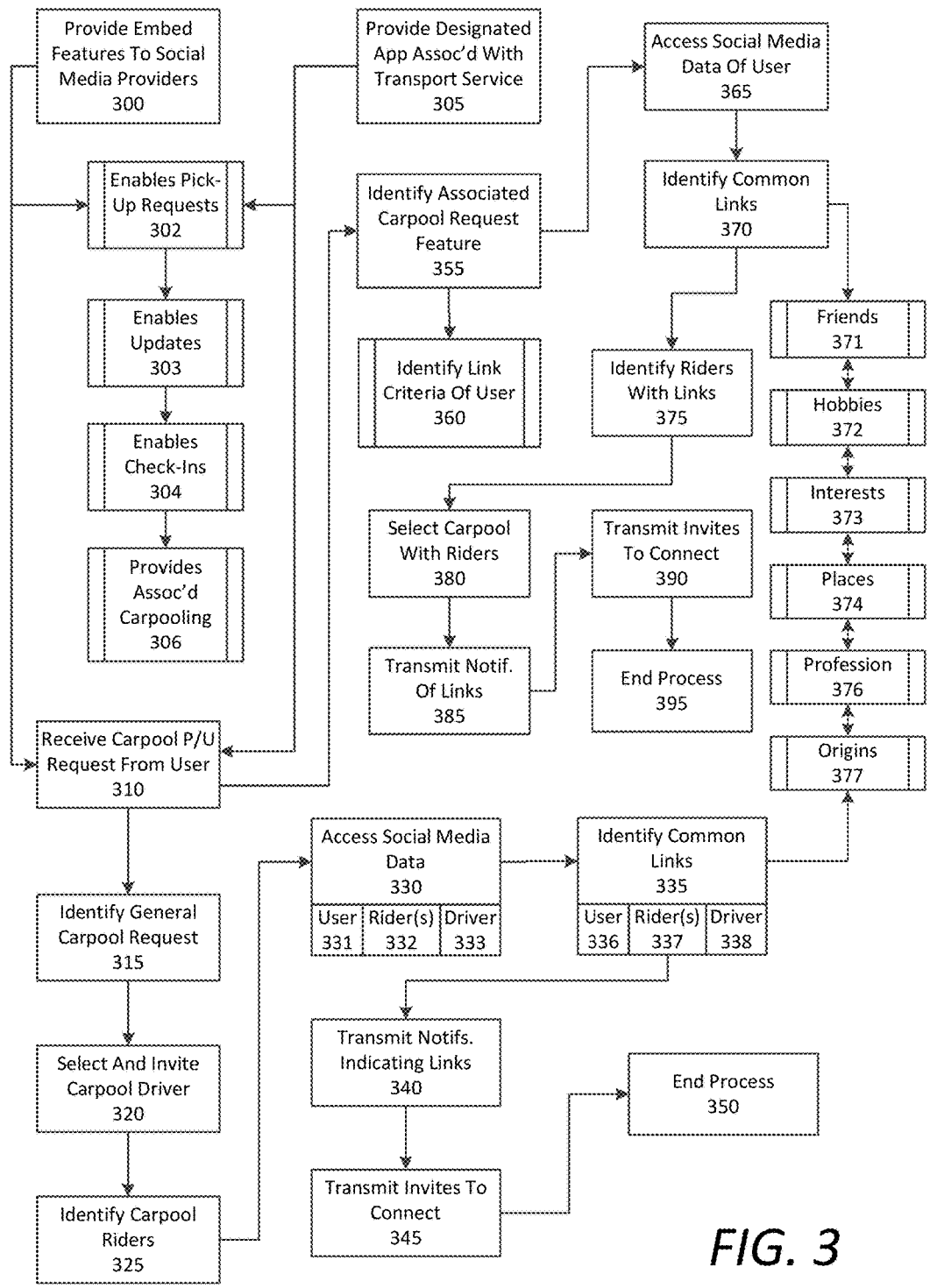
FIG. 3 is a low level flow chart illustrating an example method for facilitating user connectivity in connection with a transportation arrangement service.

FIG. 3 is a low level flow chart illustrating an example method for facilitating user connectivity in connection with a transportation arrangement service. The system 100 can provide certain embed features to social media providers to integrate the social media services with the transport arrangement service (300). The system 100 can also provide a designated application associated with the transport arrangement service to user devices 195 to enable users to directly access the transport arrangement service (305). Each of the embed features on the social media applications, and the designated application itself can enable the user to request pick-ups (302), provide updates on social media services (303), check-in or RSVP to a particular event on a social media feed (304), provide associated carpooling (306), and any combination of the above. The embed feature provided on the social media feed can further include a "take me there" feature, of an "Uber there" feature, which enables the user to request a pick-up via the social media feed directly. Furthermore, upon arriving at a particular destination, the embed feature can enable the user do a social media check-in, to provide other users, or associations of the user, with information indicating that the user has arrived. Such indications can be provided as push notifications to other users that are friends with the arriving user, and who are attending the same event.

The system 100 can receive a carpool pick-up request from a user (310). In various examples, the system 100 can identify the carpool request as a normal or general carpool request without caveats (315). In such examples, the system 100 can select and invite a proximate carpool driver to service the request (320). The system 100 can also identify carpool riders that can be picked up along the route (325), and notify the selected driver of the additional pick-ups. Furthermore, the system 100 can access social media data (330) of the carpool riders (332), the driver (333), and/or the requesting user (331). Analyzing the social media data, the system 100 can identify common links (335) between the requesting user (336), the carpool rider(s) (337), and/or driver (338). The system 100 can then generate and transmit a notification to the user that indicates the common links (340). The system 100 can also transmit an invitation for the user to connect, via one or more social media services, with another carpool rider (345). Such notifications and invitations can be transmitted at any time prior to, during, or after the ride to the destination. Once the user arrives at the destination and all notifications and invitations have been transmitted, the process can end (350).

As an addition or alternative, the carpool request may be a specialized "associated" carpool request to only match the requesting user with carpool riders that have some sort of commonality link in a particular social media service (355). Such commonality links may be preconfigured by the user, or may be have a default to enable the system 100 to find any commonality link between the requesting user and would-be carpool riders. Thus, upon receiving the associated carpool request, the system 100 can access social media data of the user (365), and determine whether there is a link between the requesting user and other requesting users. The other users may be other associated carpool requestors, or general carpool requestors. Accordingly, the system 100 can identify potential common links in the social media data of the user (370), and then identify other carpool riders that are commonly linked to the requesting user (375). As provided above, the common links can include a common friend link, a common educational institution link (e.g., the users graduated from or attended the same university), a common profession link (e.g., the users have the same or similar professions or careers), a common company link (e.g., the users are associated with or work for the same entity), a common hometown link (e.g., the users have lived in the same town, city, or state), a common place of origin link (e.g., the users were born or grew up in the same area), a common preferences link (e.g., the users enjoy similar activities, have the same or similar hobbies, enjoy similar forms of entertainment, etc.).

The system 100 can then select a particular carpool to pick-up the requesting user (380)—where the riders and/or driver of selected carpool satisfy the association criteria of the associated carpool request. Furthermore, during the ride, the system can select further pick-ups of other associated carpool riders. Before, during, and/or after the ride, the system 100 can transmit notifications indicating the commonality links (385), and can further invite the riders to connect via one or more social media services (390). Furthermore, using embed features on the designated application, the user can provide updates and/or photos through the user's social media feed. Additionally or alternatively, the user can access the social media application on the user's device and select an embed feature to provide updates of the user's location, or can provide a live map to other users indicating the user's current location and ETA to a particular event. When the user is dropped off at a particular location, the user may interact with the embed feature on the designated application to provide updates to associated users, who may be at the destination location (e.g., a particular event). Once the user arrives at the destination, and all notifications and invitations are sent, the process may end (395).

User Interface Examples

Figure 4A:
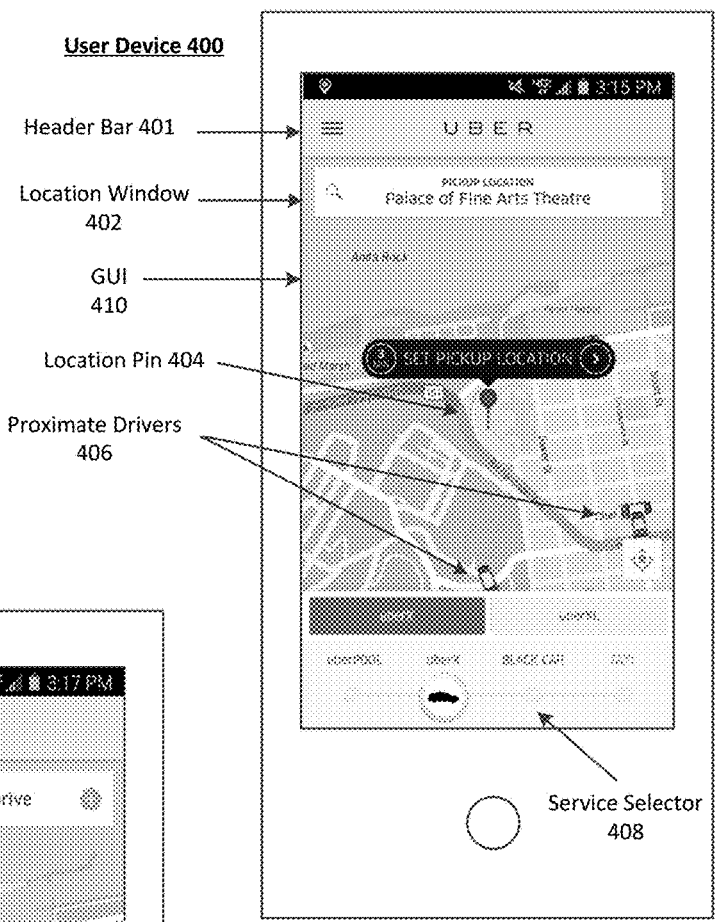
FIGS. 4A and 4B are example screenshots illustrating a user device executing applications including features as provided herein.
Figure 4B:
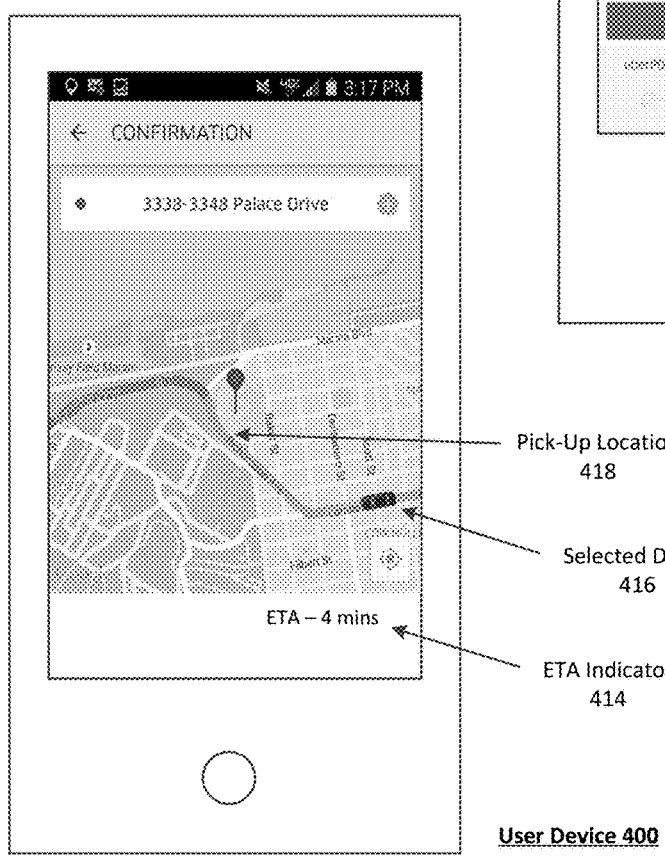

FIGS. 4A and 4B are example screenshots illustrating a user device executing applications including features as provided herein. Referring to FIG. 4A, a requesting user may launch a designated application specific to a network transport arrangement service on the user's device 400. In response to launching the application, a GUI 410 can be generated on the device 400 showing a location window 402, which can be associated with a location pin 404 on the device. The location pin 404 can be shown, by default, close to or at the current location of the user. The location window 402 can enable the user to input an address or location for pick-up. Additionally or alternatively, the user can provide input on the map on the GUI 410 to move the location pin 404 to a given location to specify a pick-up location. Upon setting the location pin 404, the location window 402 can automatically display an address corresponding to the location pin 404. In the example provided, the user has placed the location pin 404 for pick-up at the Palace of Fine Arts Theater, as identified in location window 402. The GUI 410 can further include a header bar 401, which can be selectable to toggle the application, access user profile data, access payment history data, access information about the application, access promotional content, and the like.

The GUI 410 can further include a service selector 408 which can enable the user to select a service type. For example, "uberX" as shown in FIG. 4A can correspond to one service type, while "Black Car" can correspond to a different, second service type. Similarly, a secondary selection feature can enable the user to select either "uberX" or "uberXL," in this example, which corresponds to a standard size vehicle or a larger size vehicle (SUV), respectively. The GUI 410 may also display the relative locations of proximate drivers 406 to the requesting user's current location, or to the placement of the location pin 404, that corresponds to the currently selected service type (e.g., in this example, vehicles are shown that correspond to the "uberX" service type). The user may utilize a selection feature, for example, a selection feature on the location pin 404, to request a pick-up. The user may then set a destination location and submit the pick-up request.

As provided herein, one of the selectable service types may be an "UberPool" service type. As further discussed herein, another of the selectable service type may be an "associated carpool" service type that enables the system 100 to select carpool riders and/or drivers that fulfill a certain criteria before selecting a carpool to pick-up the user—as discussed above.

Referring to FIG. 4B, upon requesting a carpool pick-up, the GUI 410 can display a pin on the pick-up location 418, and the location window 402 can reflect the pick-up address. In some examples, the GUI 410 can also disregard other proximate drivers, leaving only an icon for the selected carpool driver 416. Additionally, the GUI 410 can include an ETA indicator 414 to show an estimated time of arrival for the selected driver.

Figure 4C:
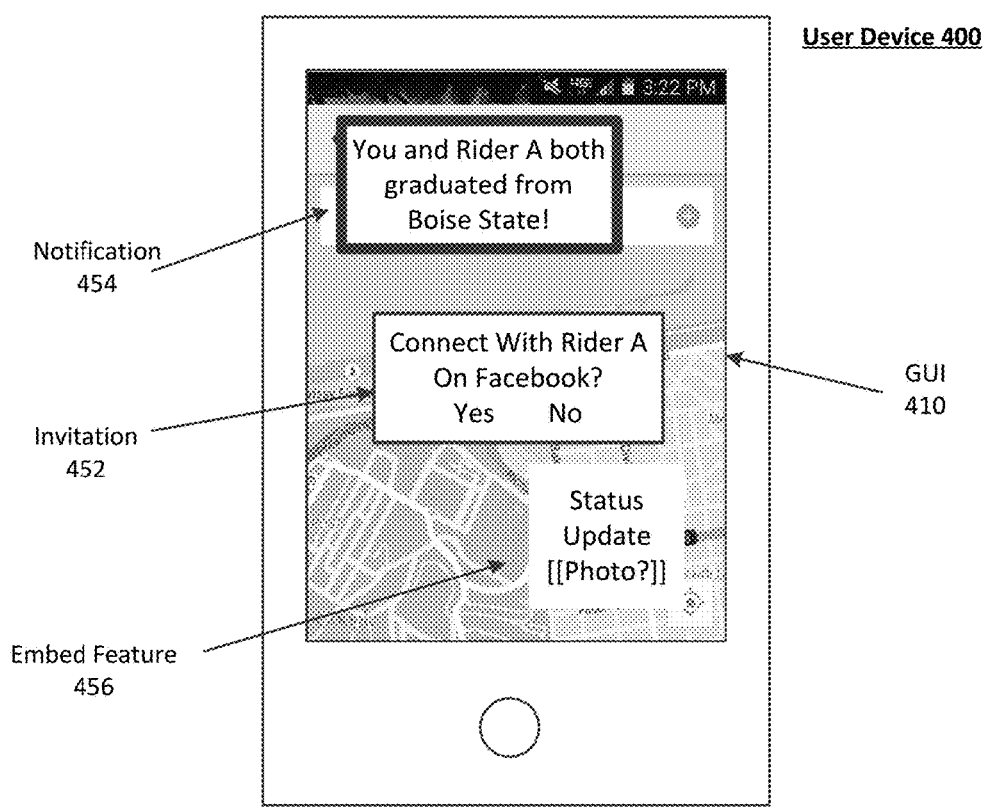
FIG. 4C is an example graphical user interface (GUI) showing a user device on which example notifications are presented, as provided herein.

FIG. 4C is a GUI showing a user device on which example notifications are presented, as provided herein. The user device 400 can display a notification 454 indicating a particular commonality link identified by the system 100. In the example provided, the notification 454 shows that the user and another carpool rider graduated from the same university. The notification 454 can be pushed over the designated application interface as a selectable icon or a pop-up window. The system 100 can further generate an invitation 452 to connect with the carpool rider, for example, once the user is dropped off. Prior to or during the carpool ride, the GUI 410 can provide an embed feature 456 to enable the user to provide status updates or take photographs for sharing over one or more social media outlets.

Hardware Diagrams

Figure 5:
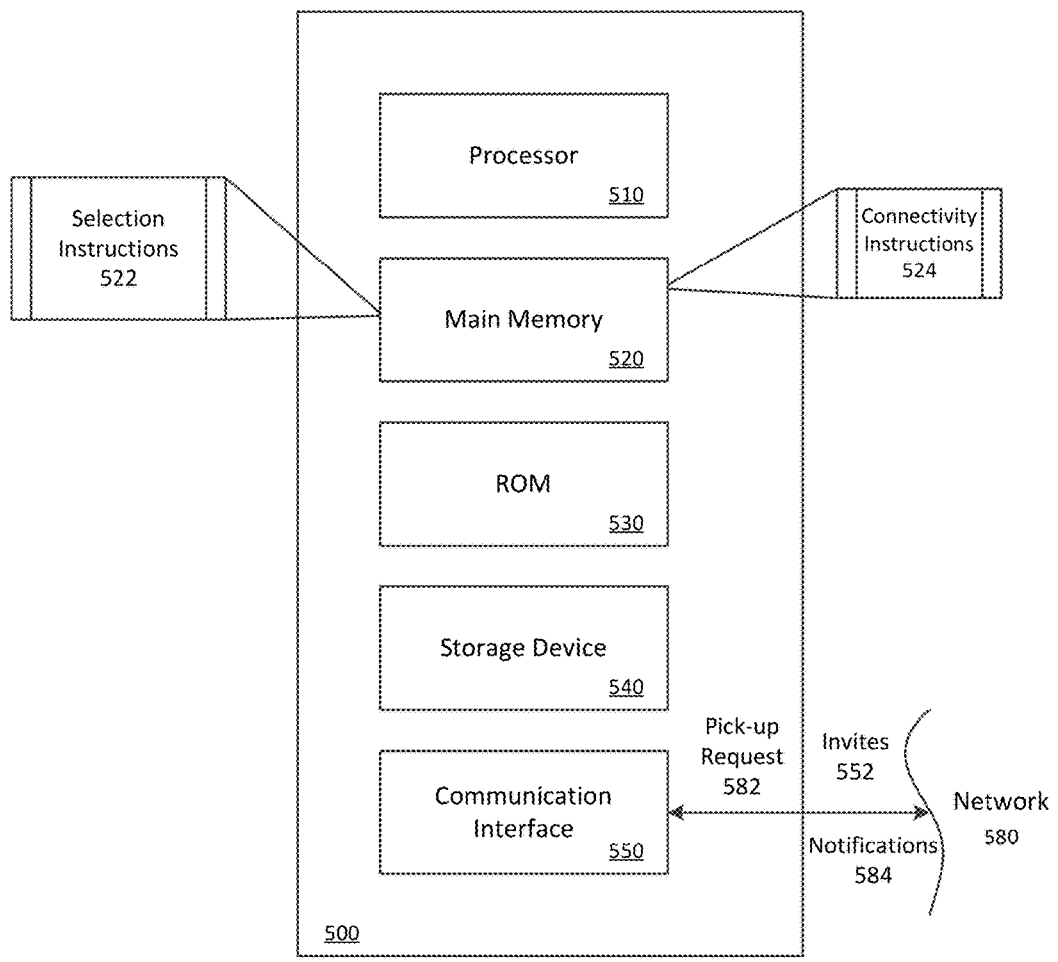
FIG. 5 is a block diagram illustrating a computer system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a transportation arrangement and networking service. In the context of FIG. 1, the transportation arrangement and networking system 100 may be implemented using a computer system such as described by FIG. 5. The transportation arrangement and networking system 100 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or wired). Using the network link, the computer system 500 can communicate with one or more computing devices, and one or more servers. In accordance with examples, the computer system 500 receives pick-up requests 582 from mobile computing devices of individual users. The executable instructions stored in the memory 530 can include selection instructions 522, which the processor 510 executes to select drivers and carpool riders to carpool with the requesting user. The executable instructions stored in the memory 520 can also include connectivity instructions 524, which enable the computer system 500 to identify other users that are commonly linked with the requesting user. By way of example, the instructions and data stored in the memory 520 can be executed by the processor 510 to implement an example transportation arrangement and networking system 100 of FIG. 1. In performing the operations, the processor 510 can receive pick-up requests 582, generate and transmit invitations 552 to drivers to service the pick-up requests 582, and transmit and/or relay notifications 584 to riders and various social media providers via the communication interface 550.

The processor 510 is configured with software and/or other logic to perform one or more processes, steps and other functions described with implementations, such as described by FIGS. 1 through 4C, and elsewhere in the present application.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
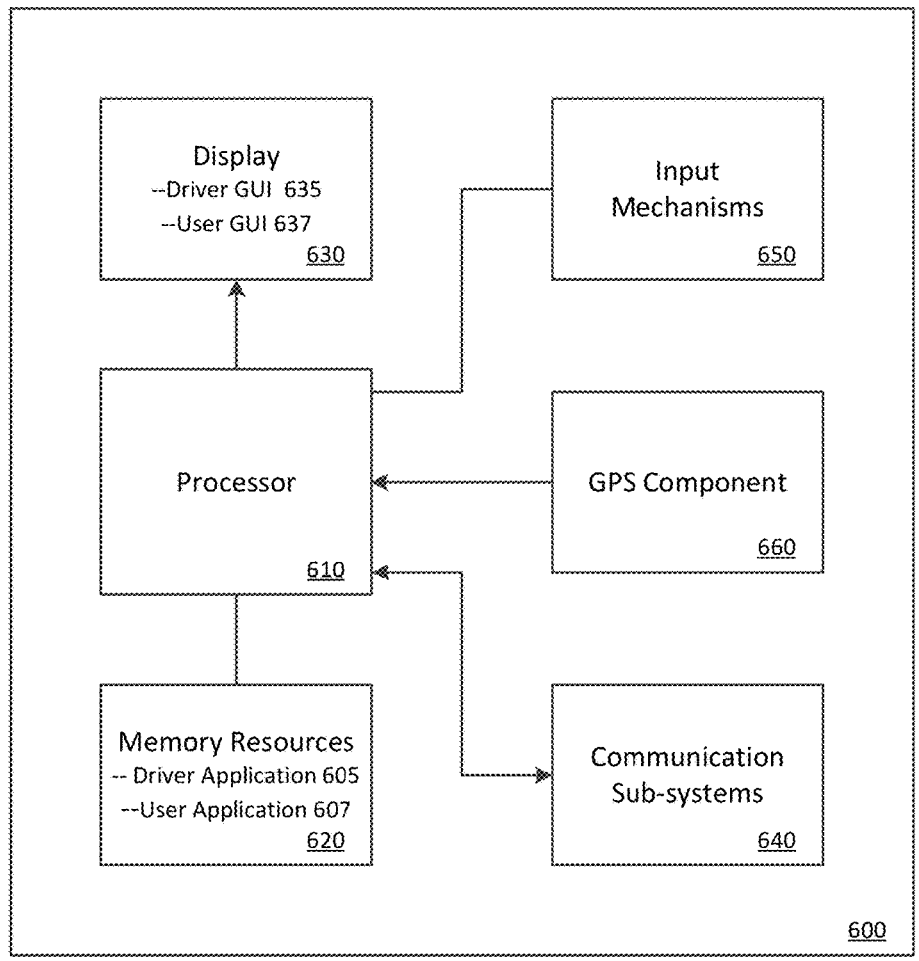
FIG. 6 is a block diagram illustrating a mobile computing device upon which examples described herein may be implemented.

FIG. 6 is a block diagram that illustrates a mobile computing device upon which examples described herein may be implemented. In one example, a mobile computing device 600 may correspond to, for example, a cellular communication device (e.g., feature phone, smartphone etc.) that is capable of telephony, messaging, and/or data services. In variations, the mobile computing device 600 can correspond to, for example, a tablet or wearable computing device. Still further, the mobile computing device 600 can be distributed amongst multiple portable devices of drivers, and requesting users.

In an example of FIG. 6, the computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

A driver of a transport vehicle can operate the mobile computing device 600 when on a shift to provide transportation services. The memory resources 620 can store a designated driver application 605 for linking the mobile computing device 600 with a network service that enables or otherwise facilitates the drivers' ability to efficiently service pick-up requests. Execution of the driver application 605 by the processor 610 may cause a specified driver graphical user interface (GUI) 635 to be generated on the display 630. Interaction with the driver GUI 635 can enable drivers of transport vehicles to receive assignments to service pick-up requests or perform a pickup and/or drop-off.

A requesting user of the network service can operate the mobile computing device 600 to transmit a pick-up request including a pick-up location. The memory resources 620 can store a designated user application 607 to link the requesting user with the network service to facilitate a pick-up. Execution of the user application 607 by the processor 610 can cause a user GUI 637 to be generated on the display 630. User interaction with the user GUI 637 can enable the user to transmit a carpool pick-up request in connection with the network service, which enables drivers to accept an invitation to service the pick-up request. Furthermore, notifications of commonality links and invitations to connect with other carpool riders can be presented to the user GUI 637. Still further, an embed feature can be provided on the GUI 637 so that users can transmit updates and the like to social media service providers to update a user profile or status feed via the user application 607.

While examples of FIG. 5 and FIG. 6 provide for a computer system 500 and mobile computing device 600 for implementing aspects described, in some variations, the mobile computing device 600 can operate to implement some or all of the functionality described with the transport arrangement and networking system 100.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A transport arrangement system implementing a transport service, comprising:
   a network communication interface to communicate, over one or more wireless networks, with (i) a user application executing on computing devices of users of the transport service, and (ii) a driver application executing on computing devices of drivers of the transport service;
   one or more processors; and
   one or more memory resources storing instructions that, when executed by the one or more processors, cause the transport arrangement system to:
     receive, over the one or more wireless networks, a pick-up request from the user application executing on a computing device of a requesting user, the pick-up request including a carpool service preference to carpool with other users of the transport service, wherein the carpool service preference indicates a limitation to select only carpool riders that have at least one common social network link with the requesting user;
     transmit, over the one or more wireless networks, a transport invitation to the driver application executing on a computing device of a proximate carpool driver of a carpool vehicle to service the pick-up request;
     access, over the one or more wireless networks, social media data of the requesting user and a plurality of potential carpool riders;
     based on accessing the social media data, identify one or more common social network links between the requesting user and each of one or more carpool riders;
     select the one or more carpool riders to ride with the requesting user in the carpool vehicle; and
     generate and transmit, over the one or more wireless networks, a notification to the user application executing on the computing device of the requesting user, the notification comprising an invitation to connect with the one or more carpool riders via one or more social media platforms and indicating the one or more common social network links between the requesting user and each of the one or more carpool riders;
   wherein the executed instructions cause the transport arrangement system to generate and transmit the notification to the user application executing on the computing device of the requesting user when the requesting user is picked up by the proximate carpool driver.

2. The transport arrangement system of claim 1, wherein the one or more common social network links between the requesting user and each of the one or more carpool riders comprises at least one of a common friend link, a common educational institution link, a common profession link, a common company link, a common hometown link, a common place of origin link, or a common preferences link.

3. The transport arrangement system of claim 1, wherein the executed instructions cause the transport arrangement system to transmit the transport invitation to the driver application executing on the computing device of the proximate carpool driver after determining that each of the one or more carpool riders have the one or more common social network links with the requesting user.

4. The transport arrangement system of claim 1, wherein the executed instructions cause the transport arrangement system to access the social media data from a plurality of social media providers.

5. The transport arrangement system of claim 4, wherein the social media data comprises profile data, of the requesting user and the one or more carpool riders, from each of the plurality of social media providers.

6. The transport arrangement system of claim 1, wherein the executed instructions further cause the transport arrangement system to:
provide an embed feature to a social media provider to enable users of the transport service to access the transport service from a social media application associated with the social media provider.

7. The transport arrangement system of claim 6, wherein the pick-up request is received, over the one or more wireless networks, via the embed feature on the social media application executing on the computing device of the requesting user.

8. The transport arrangement system of claim 7, wherein the embed feature is provided for an event feed on the social media application, the event feed corresponding to a user profile of the requesting user on the social media application.

9. The transport arrangement system of claim 1, wherein the executed instructions further cause the transport arrangement system to:
detect, over the one or more wireless networks, that the user application has been executed on the computing device of the requesting user;
wherein the pick-up request is received, over the one or more wireless networks, via the user application executing on the computing device of the requesting user.

10. The transport arrangement system of claim 9, wherein the executed instructions further cause the transport arrangement system to:
generate an embed feature on the user application to enable the requesting user to share data related to a user experience of the requesting user on one or more social media platforms.

11. The transport arrangement system of claim 10, wherein the embed feature enables the requesting user to take a photograph via the user application and share the photograph over the one or more social media platforms through the user application.

12. The transport arrangement system claim 10, wherein the embed feature enables the requesting user to provide a status update via the user application and share the status update over the one or more social media platforms through the user application.

13. A method for implementing a transport service, the method being performed by one or more processors and comprising:
communicating, over one or more wireless networks, with (i) a user application executing on computing devices of users of the transport service, and (ii) a driver application executing on computing devices of drivers of the transport service;
receiving, over the one or more wireless networks, a pick-up request from the user application executing on a computing device of a requesting user, the pick-up request including a carpool service preference to carpool with other users of the transport service, wherein the carpool service preference indicates a limitation to select only carpool riders that have at least one common social network link with the requesting user;
transmitting, over the one or more wireless networks, a transport invitation to the driver application executing on a computing device of a proximate carpool driver of a carpool vehicle to service the pick-up request;
accessing, over the one or more wireless networks, social media data of the requesting user and a plurality of potential carpool riders;
based on accessing the social media data, identifying one or more common social network links between the requesting user and each of one or more carpool riders;
selecting the one or more carpool riders to ride with the requesting user in the carpool vehicle; and
generating and transmitting, over the one or more wireless networks, a notification to the user application executing on the computing device of the requesting user, the notification comprising an invitation to connect with the one or more carpool riders via one or more social media platforms and indicating the one or more common social network links between the requesting user and each of the one or more carpool riders;
wherein the one or more processors generate and transmit the notification to the user application executing on the computing device of the requesting user when the requesting user is picked up by the proximate carpool driver.

14. A non-transitory computer readable medium storing instructions that, when executed by one or more processors, cause the one or more processors to:
communicate, over one or more wireless networks, with (i) a user application executing on computing devices of users of a transport service, and (ii) a driver application executing on computing devices of drivers of the transport service;
receive, over the one or more wireless networks, a pick-up request from a computing device of a requesting user, the pick-up request including a carpool service preference to carpool with other users of the transport service, wherein the carpool service preference indicates a limitation to select only carpool riders that have at least one common social network link with the requesting user;
transmit, over the one or more wireless networks, a transport invitation to the driver application executing on a computing device of a proximate carpool driver of a carpool vehicle to service the pick-up request;
access, over the one or more wireless networks, social media data of the requesting user and a plurality of potential carpool riders;
based on accessing the social media data, identify one or more common social network links between the requesting user and each of one or more carpool riders;

select the one or more carpool riders to ride with the requesting user in the carpool vehicle; and generate and transmit, over the one or more wireless networks, a notification to the user application executing on the computing device of the requesting user, the notification comprising an invitation to connect with the one or more carpool riders via one or more social media platforms and indicating the one or more common social network links between the requesting user and each of the one or more carpool riders;

wherein the executed instructions cause the one or more processors to generate and transmit the notification to the user application executing on the computing device of the requesting user when the requesting user is picked up by the proximate carpool driver.

\* \* \* \* \*